United States Patent [19]

Bushman

[11] Patent Number: 5,428,221
[45] Date of Patent: Jun. 27, 1995

[54] HEAT RADIATION DETECTION SYSTEM

[75] Inventor: Boyd B. Bushman, Lewisville, Tex.

[73] Assignee: Lockheed Corporation, Fort Worth, Tex.

[21] Appl. No.: 454,165

[22] Filed: Dec. 21, 1989

[51] Int. Cl.⁶ ............................................. G02N 21/00
[52] U.S. Cl. ................................... 250/342; 250/372; 244/3.16; 342/52
[58] Field of Search ............... 250/342, 372; 244/3.13, 244/3.16; 342/52, 56, 192, 351

[56] References Cited

U.S. PATENT DOCUMENTS

| | | | |
|---|---|---|---|
| 3,021,428 | 2/1962 | Mattke et al. | |
| 3,053,932 | 9/1962 | Worst | 358/110 |
| 3,796,396 | 3/1974 | Crovella | 244/3.14 |
| 3,848,129 | 11/1974 | Figler et al. | 250/339 |
| 3,852,741 | 12/1974 | McDonald | 324/644 |
| 3,944,167 | 3/1976 | Figler et al. | 250/339 |
| 4,028,544 | 7/1977 | Jourdan et al. | 250/203 R |
| 4,234,145 | 11/1980 | Leiboff | 244/3.16 |
| 4,397,429 | 8/1983 | Fouilloy | 244/3.11 |
| 4,666,103 | 5/1987 | Allen | 244/3.11 |
| 4,773,754 | 9/1988 | Eisele | 356/152 |
| 4,849,620 | 7/1989 | Guerin et al. | 250/339 |

Primary Examiner—Carolyn E. Fields
Assistant Examiner—James E. Beyer
Attorney, Agent, or Firm—James E. Bradley

[57] ABSTRACT

A detection system will detect and identify self-propelled objects, such as missiles, which create a hot exhaust plume. The exhaust plume has radiation which modulates with a frequency range of interest. This frequency range can be detected with various detectors, such as an infrared detector, an ultraviolet detector, or even a radio frequency detector. Guided missiles have radiation frequencies which are much higher than the radiation frequencies of jet aircraft and of reciprocating engines. A filter will filter the output signals from the detector, and discard those outside of the frequency range of interest. A warning signal will indicate if frequencies are encountered within the frequency range of interest.

32 Claims, 3 Drawing Sheets

HEAT RADIATION DETECTION SYSTEM

CROSS-REFERENCE TO RELATED APPLICATION

An application entitled "Communication System Using Exhaust Plume Modulation" by the same inventor is being simultaneously filed with this application.

BACKGROUND OF THE INVENTION

1. Field of the Invention

This invention relates in general to detecting characteristics of hot gaseous plumes such as missile and jet engine exhaust, and in particular to means for identifying the object based upon the modulation within the plume.

2. Description of the Prior Art

Most military jets that are downed by an enemy are destroyed by missiles. The missiles may be either radar or infrared guided missiles. If the aircraft pilot detects the missile being fired at him, he can take counter measures. He can make tight maneuvers, and he could eject flares and metal chaff to confuse either heat or radar guided missiles.

The counter measures require that the pilot be able to detect the missile before it becomes too close for any counter measures to be taken. Once the missile is launched, the pilot has only about one second to detect it, and another two seconds to start the counter measures. Current systems do not provide adequate detection of the launching of a missile.

Modern aircraft are vulnerable to missiles because of active and passive missile guidance techniques. The missile can passively lock onto the aircraft plume, hot metal parts and/or aircraft emissions such as radar and radio. Actively, the missile can be guided to the airplane by its own radar or laser.

The aircraft is not now warned of the oncoming missile because radar warning techniques will give away the position of the aircraft. Present infrared technique are useless because of the extremely high number of heat sources in the battle field, each of which looks like a missile to existing infrared systems. There may be other aircraft in the area, including friendly aircraft which produce heat. Ground fire could also cause a false alarm. Even if detected, the pilot must learn of the fired missile early enough to begin his counter measures.

SUMMARY OF THE INVENTION

In this invention, a radiation detection system will detect hot gaseous plume modulation within a wide area. The detector mounts to the aircraft for detecting missile radiation that is unique to the missile plume.

Gaseous plumes from different sources have different modulation characteristics. The gases from the exhaust of self-propelled objects vibrate or flicker differently. These modulations of a gaseous plume can be detected by detectors on the aircraft. Missiles will have exhaust flames that vibrate at frequencies up to about 80,000 Hz (Hertz). Military jet aircraft, on the other hand, have exhaust flames that will have modulation frequencies less than 10,000 Hz, even when using an after burner. Reciprocating engines on the ground have gaseous plumes which radiate in much lower modulation frequencies, typically no more than 100 Hz.

The detector system employs/filter an electronic filter which will identify any radiation which has modulation frequencies in a range that may be 10,000 Hz to 100,000 Hz, but is preferably 20,000 Hz to 80,000 Hz. The output from the electronic filter will provide a warning to the pilot so that he can begin effective counter measures.

DETAILED DESCRIPTION OF THE INVENTION

Figure 1:
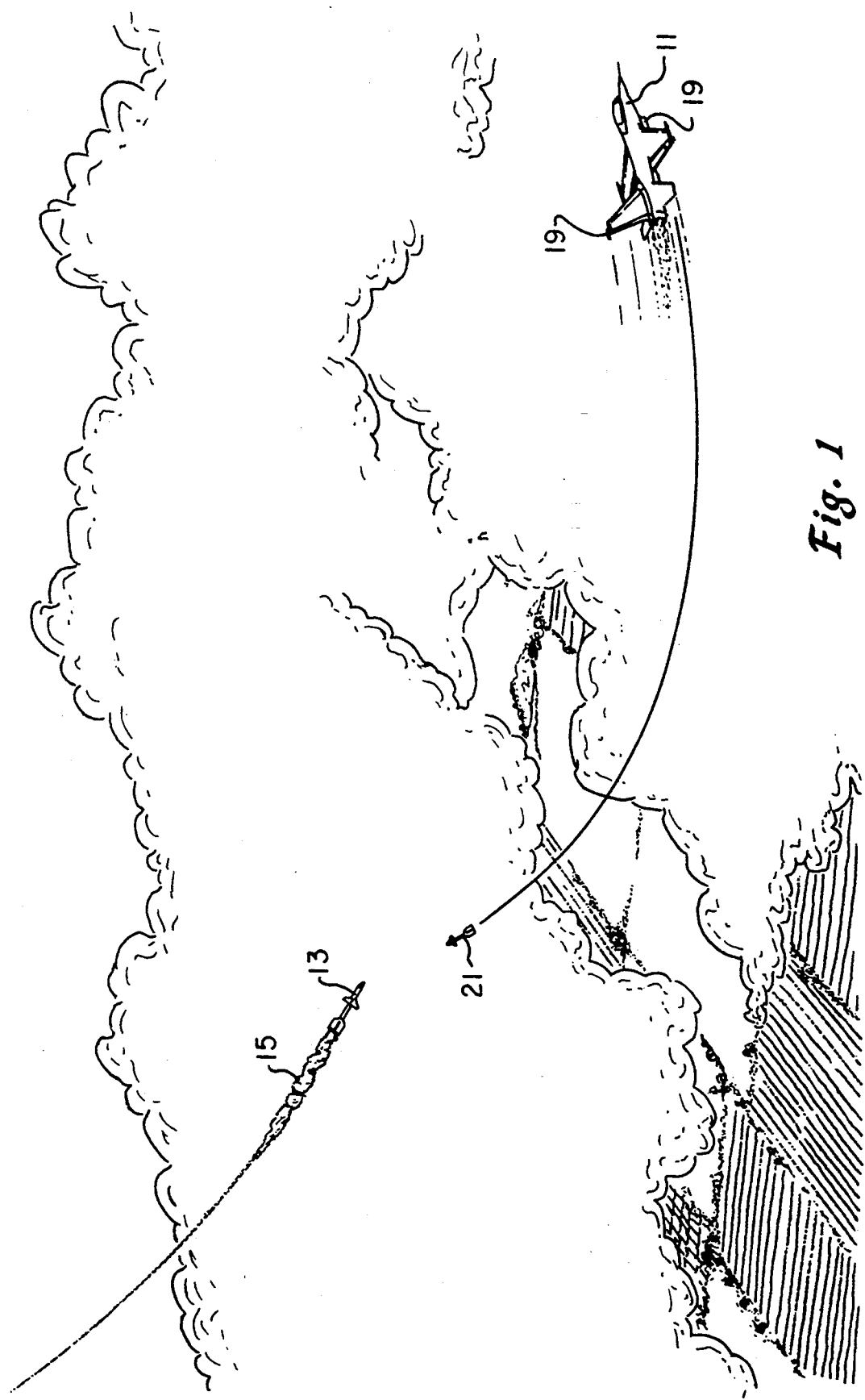
FIG. 1 is a pictorial representation of an aircraft being warned of the pursuit by a missile.

Referring to FIG. 1, a military jet aircraft 11 is shown being pursued by an attacking missile 13. Missile 13 may either be radar guided or guided by an infrared detector. Missile 13 will be powered by a rocket engine which discharges a hot gaseous plume 15 which modulates. Plume 15 will be considerably larger in diameter than the diameter of the missile 13. In addition, it will stream behind the missile 13 a considerable distance.

Plume 15 is made up of molecules and atoms discharging at high exit velocities from missile 13. The molecules and the atoms will radiate optically and electromagnetically. Radio frequency waves will also radiate, possibly because the plume 15 becomes positively charged as a result of electrons being stripped from the atoms exiting at high velocity. The radiation will radiate in all directions.

Tests have determined that the plume 15 will flicker, similar to the flicker of a flame, but at a much higher rate. This flicker or modulation of the radiation can be detected by detectors 19 on the aircraft 11. Each detector 19 may be an electro-optical detector, such as an infrared detector or an ultraviolet detector. Furthermore, it could be a radio frequency receiver. It may be a combination of all three. Normally there will be several detectors 19 on the aircraft 11 in at least two different locations to observe in all directions.

The detector 19 will detect the modulation of the plume 15, identify it as coming from a missile 13, and provide a warning to the pilot of the aircraft 11. The pilot may take counter measures to avoid being struck by the missile 13. In addition, he may actively attack the missile 13 such as by firing an anti-missile missile 21, laser or particles.

Figure 2:
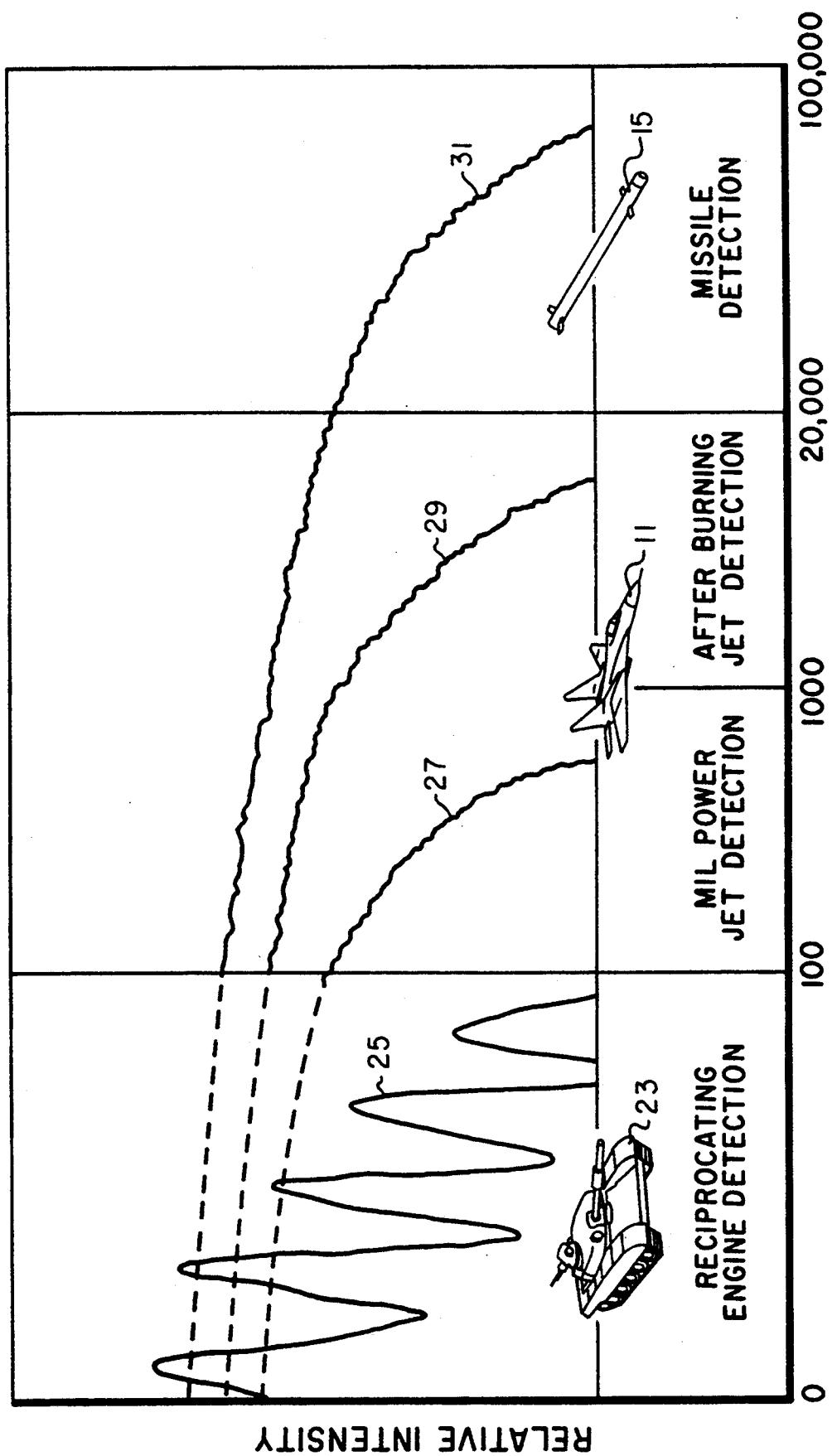
FIG. 2 is a graph illustrating the various radiation frequencies observed from the exhausts of reciprocating engines, military jets, and missiles.

FIG. 2 illustrates the radiation modulation detected by three different self-propelled objects that may be present within the view of the detector 19 (FIG. 1). Tank 23 represents land vehicles which will have internal combustion reciprocating engines. The curve 25 shows the radiation detected by an infrared detector during experiments with reciprocating engines. The maximum modulated frequency of this radiation is less than 100 Hz.

The jet 11 has one curve 27 which represents the frequencies that will be encountered by measuring its exhaust plume during normal military thrust. The curve 27 is obtained by connecting an infrared or ultraviolet detector 19 to a Fast Fourier Transform unit. The fast Fourier Transform unit is a commercially available unit. The one employed is a Hewlett-Packard dynamic signal analyzer. It plots the frequencies encountered versus time. A separate curve at selected intervals will normally be taken, the intervals being ⅛ second apart in order to get a full view for the spectrum of frequencies that will be obtained with time.

These frequencies extend from zero up to somewhat less than 1000 Hz in the case of curve 27. With the after burner, the frequencies become much higher. Under after burner conditions, frequencies will be encountered as high as about 9,000 Hz with the particular jet monitored. Curve 29 shows a frequency spectrum that ranges from zero to a level less than 10,000 Hz. To account for a safety margin, the frequency range of interest of military jets may be considered to be from about 100 Hz to about 20,000 Hz.

Fortunately for detection, the missile 15 will have frequencies that modulate much higher than 20,000 Hz. Curve 21 shows that frequencies can be encountered from zero up to about 80,000 Hz. The frequency range of interest for a missile can be considered to be from about 20,000 Hz to about 80,000 Hz, or if desired, the upper limit could be increased to 100,000 Hz. The missile detection system can filter out any radiation which has frequencies only below 20,000 Hz, thus identifying to the detector that a missile 13 has been launched.

Similarly, if it is desired to detect to detect jet airplanes, signals which have frequencies below 100 Hz and those which have frequencies above 20,000 Hz could be filtered out. Furthermore, if it is desired to detect a ground reciprocating engine vehicle, signals with frequencies above 100 Hz could be filtered out.

There are other sources of radiation that will be detected by the detector 19. Background radiation such as from hills, sky, clouds, etc. do not move or modulate in the region of interest. Battle field flares and aircraft flares provide radiation modulation. However, their modulation is lower frequency than the range of interest for a missile. Fires are only about 50 Hz. Flares may be up to about 2,000 Hz. Sun flares can be as high as about 2,000 Hz, as well, still far below the region of interest for missiles.

Lightning causes short high frequency bursts above 100,000 Hz. These can be used to discriminate from the missile region of interest, which is about 20,000 Hz to 80,000 Hz. Also, tests have determined that lightning lasts no more than 1/16 of a second. Consequently, the detector system can also have a time delay which blocks signals from radiation that last less than about ¼ of a second.

Figure 3:
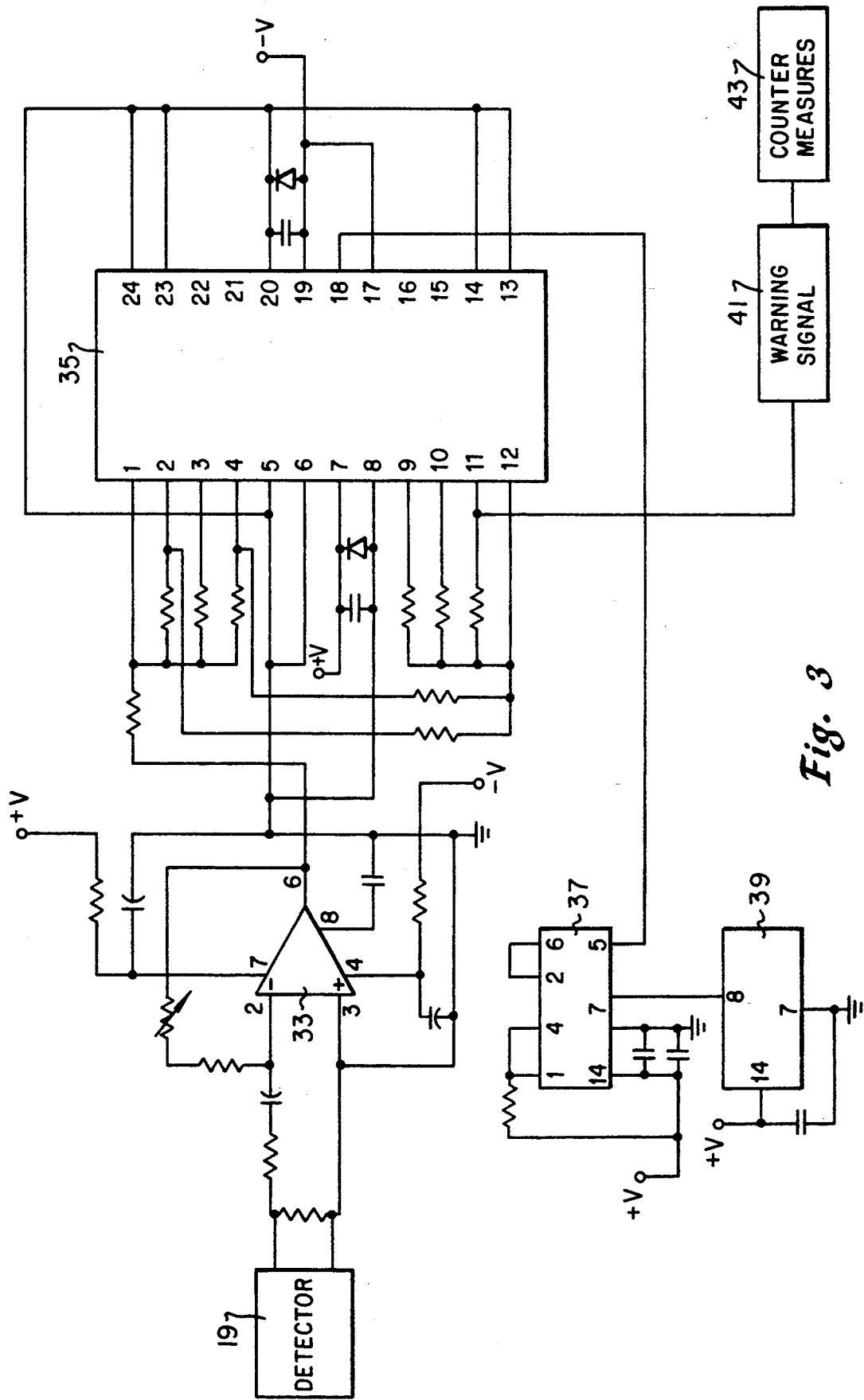
FIG. 3 is an electrical schematic view illustrating a detection system of this invention.

FIG. 3 illustrates more details of the detector system. Detector 19, as mentioned, can be of various types. One suitable infrared detector is a cryogenically cooled indium antimonide infrared detector. It must be cooled to about 80 degrees Kelvin. Liquid nitrogen may be employed to cool the detector 19 if it is an infrared detector.

The infrared detector 19 can be exchanged for a room temperature visible and/or ultraviolet detector, such as a silicon detector. The silicon detector measures both the visible and the ultraviolet light waves. Detector 19 may also be a radio receiver, which will also detect radiation from the plume 15. In one test, the radio receiver carrier frequency was swept between 100 and 600 kHz. Low frequency modulations as shown in FIG. 2 were detected at all of these radio receiver carrier frequencies.

Referring still to FIG. 3, the detector 19 will be connected to a conventional preamplifier 33. Preamplifier 33 will have associated circuitry as shown. The output from the preamplifier 33 leads to an electronic sweeping filter 35. Filter 35 may be a conventional electronic filter, which will be connected conventionally with its associated circuitry as shown. One type employed is an LTC 1064 integrated circuit. Filter 35 is driven by a timing circuit comprising the integrated circuits 37, 39. The circuits 37, 39 are respectively an SN 7474 and an XO Bomar 994-1035, 4 MHz. In the alternative, filter 35 may be driven by a standard frequency varying input.

Filter 35 upon receiving an output from the preamplifier 33, will sweep frequencies across with time. Filter 35 will be set to discriminate so that it will provide an output only if it receives a signal having frequencies greater than 20,000 Hz and no more than 80,000 Hz. The range of interest could be increased to about 10,000 Hz to 100,000 Hz if desired.

The output of the filter 35 will be a DC signal which leads to a warning signal circuit 41. The warning signal circuit 41 may be a light or an audible signal. The warning signal circuit 41 may be connected to an automatic counter measure circuit 43. Alternatively, the pilot may take control of counter measures himself. The counter measure circuit 43 could undertake automated counter measures such as ejecting flares and metal chaff or maneuvering the aircraft 11. Furthermore, the counter measure circuit 43 could fire the anti-missile missile 21, as illustrated in FIG. 1, or a laser or particle beam.

In operation, detector 19 will monitor for any radiation in the desired frequency range. The distance range will be many miles. The distance range is inversely proportional to the square root of the frequency band width. The low frequency band width of 20,000 Hz to 80,000 Hz is small, resulting in a large detection range.

Any radiation picked up by detector 19 will pass through the preamplifier 33 into the electronic filter 35. If the frequencies from the detected radiation are less than 20,000 Hz or exceed 80,000 Hz, then no warning signal will be provided by the circuit 41. On the other hand, if the signal has frequencies between 20,000 and 80,000 Hz and none higher than 80,000 Hz, then the filter 35 will provide an output to the warning signal circuit 41. The warning signal circuit 41 will provide a warning to the pilot or automatically counter the missile. Counter measures will be taken to avoid attack by the missile 13.

The detection system has significant advantages. It could require only a single passive detector. It discriminates from other gaseous plumes and provides a warning only if a missile has been launched. It operates quickly, providing a warning signal within a less than a second of detection. It easily eliminates false targets, such as other aircraft, gun flashes, tanks or trucks. It easily eliminates background noise from fires, clouds, lightning, ground emissions, solar glint, flares, etc. The low frequency of the modulations gives a very long range of detection.

This technique is able to distinguish one class of target from another. With proper filtering, one type of missile can be distinguished from another. Similarly, one type of jet aircraft can be distinguished from another. This permits passive identification of the aircraft encountered. Identification of friend or foe will be possible.

While the invention has been shown in only one of its forms, it should be apparent to those skilled in the art that it is not so limited, but is susceptible to various changes without departing from the scope of the invention.

I claim:

1. An apparatus for detecting and identifying self-propelled objects which create a hot exhaust plume with radiation which flickers within a flicker frequency range of interest, comprising:
   detector means for detecting the radiation created by an exhaust plume, and for producing an electrical output signal having frequencies corresponding to the flicker frequencies of the radiation;
   electronic filter means for electronically blocking any output signals from the detector means which are outside of the flicker frequency range of interest and for providing an output if the output signals are within the flicker frequency range of interest; and
   means for providing an identifying signal if the electronic filter means provides an output indicating that radiation is detected within the flicker frequency range of interest.

2. The apparatus according to claim 1 wherein the detector means is an electro-optical detector.

3. The apparatus according to claim 1 wherein the detector means is an infrared detector.

4. The apparatus according to claim 1 wherein the detector means is an ultraviolet detector.

5. The apparatus according to claim 1 wherein the detector means is a radio frequency receiver.

6. The apparatus according to claim 1 wherein the frequency range of interest is substantially 10,000 Hz to 100,000 Hz.

7. The apparatus according to claim 1 wherein the frequency range of interest is substantially 100 Hz to 20,000 Hz.

8. The apparatus according to claim 1 wherein the frequency range of interest is substantially less than 100 Hz.

9. The apparatus according to claim 1 wherein the detector means comprise means for detecting the radiation created by an exhaust plume from a guided missile.

10. The apparatus according to claim 1 wherein the detector means comprise means for detecting the radiation created by an exhaust plume from a jet airplane.

11. The apparatus according to claim 1 wherein the detector means comprise means for detecting the radiation created by an exhaust plume from a self-propelled object having an internal combustion reciprocating engine.

12. In an aircraft, an apparatus for detecting and identifying self-propelled objects which create a hot exhaust plume with light radiation which flickers within a flicker frequency range of interest, comprising:
   detector means mounted to the aircraft for optically detecting any radiation created by exhaust plumes, and for creating an electrical output signal having frequencies corresponding to the flicker frequencies of the radiation;
   electronic filter means for electronically filtering output signals which have frequencies only below the flicker frequency range of interest and output signals which have frequencies above the flicker frequency range of interest, and for providing an output if the output signals have frequencies within the flicker frequency range of interest; and
   means for providing a warning signal if the electronic filter means provides an output, indicating that radiation has been detected within the flicker frequency range of interest.

13. The apparatus according to claim 12 wherein the detector means is an infrared detector.

14. The apparatus according to claim 12 wherein the detector means is an ultraviolet detector.

15. The apparatus according to claim 12 wherein the frequency range of interest is substantially 20,000 Hz to 80,000 Hz.

16. The apparatus according to claim 12 wherein the frequency range of interest is substantially 100 Hz to 10,000 Hz.

17. The apparatus according to claim 12 wherein the frequency range of interest is substantially less than 100 Hz.

18. A method for detecting and identifying self-propelled objects which create a hot exhaust plume, comprising:
   determining a flicker frequency range of interest at which radiation in exhaust plumes of self-propelled objects of that nature flicker;
   detecting the radiation created by the exhaust plume and creating an electrical output signal having frequencies corresponding to the flicker frequencies of the radiation;
   electronically filtering output signals with frequencies only below the flicker frequency range of interest; and
   providing an identifying signal if frequencies are detected within the flicker frequency range of interest.

19. The method according to claim 18 wherein the step of detecting includes optically detecting the radiation.

20. The method according to claim 18 wherein the step of detecting includes optically detecting the radiation with an infrared detector.

21. The method according to claim 18 wherein the step of detecting includes optically detecting the radiation with an ultraviolet detector.

22. The method according to claim 18 wherein the step of detecting includes detecting the radiation with a radio frequency receiver.

23. The method according to claim 18 wherein the frequency range of interest determined is from 10,000 Hz to 100,000 Hz.

24. The method according to claim 18 wherein the frequency range of interest determined is from 100 Hz to 20,000 Hz.

25. The method according to claim 18 wherein the frequency range of interest determined is less than 100 Hz.

26. The method according to claim 18 wherein the self-propelled object detected is a guided missile.

27. The method according to claim 18 wherein the step of determining said frequency range of interest is performed by the following steps:
   detecting the radiation of exhaust plumes of various self-propelled objects likely to be encountered; and
   creating electrical output signals corresponding to the modulated frequencies of the radiation detected to determine the frequencies generated by the various self-propelled objects likely to be encountered.

28. A method for detecting and identifying from an aircraft a guided missile, comprising:
   determining a flicker frequency range of interest at which light radiation in exhaust plumes of guided missiles flicker;
   mounting an optical detector in the aircraft and optically detecting the radiation created by all exhaust plumes encountered by the aircraft;

creating an electrical output signal having frequencies corresponding to the flicker frequencies of the radiation detected;

electronically filtering output signals which have frequencies only below the flicker frequency range of interest and which have frequencies above the flicker frequency range of interest; and providing a warning signal if output signals are within the flicker frequency range of interest.

29. The method according to claim 28 wherein the step of detecting includes optically detecting the radiation with an infrared detector.

30. The method according to claim 28 wherein the step of detecting includes optically detecting the radiation with an ultraviolet detector.

31. The method according to claim 28 wherein the frequency range of interest determined is substantially from 20,000 Hz to 80,000 Hz.

32. The method according to claim 28 wherein the step of determining the frequency range of interest is performed by the following steps:

detecting the radiation of exhaust plumes of various self-propelled objects including missiles likely to be encountered; and creating electrical output signals corresponding to the modulated frequencies of the radiation detected to determine the frequencies generated by the various self-propelled objects and missiles likely to be encountered.

* * * * *